United States Patent
Chu et al.

(10) Patent No.: US 10,127,930 B1
(45) Date of Patent: Nov. 13, 2018

(54) IN-FIELD LASER CALIBRATION FOR HEAT-ASSISTED MAGNETIC RECORDING HEAD USING TEMPERATURE COMPENSATION EQUATION

(71) Applicant: Seagate Technology LLC, Cupertino, CA (US)

(72) Inventors: Alfredo Sam Chu, Prior Lake, MN (US); Franklin P. Martens, Bloomington, MN (US); Drew Michael Mader, Minneapolis, MN (US); Steven J. Kimble, Chanhassen, MN (US); James E. Angelo, Savage, MN (US)

(73) Assignee: Seagate Technology LLC, Cupertino, CA (US)

( * ) Notice: Subject to any disclaimer, the term of this patent is extended or adjusted under 35 U.S.C. 154(b) by 0 days.

(21) Appl. No.: 15/919,386

(22) Filed: Mar. 13, 2018

(51) Int. Cl.
  *G11B 5/02* (2006.01)
  *G11B 5/60* (2006.01)
  *G11B 5/00* (2006.01)

(52) U.S. Cl.
  CPC ............... *G11B 5/02* (2013.01); *G11B 5/607* (2013.01); *G11B 2005/0021* (2013.01)

(58) Field of Classification Search
  CPC ........... G11B 5/012; G11B 27/36; G11B 5/02; G11B 2220/20; G11B 5/00; G11B 2005/0021; G11B 2005/0005; G11B 5/314; G11B 5/09; G11B 5/024
  USPC ............... 360/25, 31, 39, 55, 59, 65, 66
  See application file for complete search history.

(56) References Cited

U.S. PATENT DOCUMENTS

| | | | |
|---|---|---|---|
| 7,095,577 B1 | 8/2006 | Codilian et al. | |
| 8,320,070 B2 * | 11/2012 | Yoshida | G11B 5/02 360/31 |
| 9,042,207 B2 | 5/2015 | Dakroub | |
| 9,236,081 B1 | 1/2016 | Chu et al. | |
| 9,502,061 B1 | 11/2016 | Zhu et al. | |
| 9,704,529 B1 | 7/2017 | Lou et al. | |
| 2013/0077453 A1 | 3/2013 | Alex | |
| 2014/0119164 A1 | 5/2014 | Wilson et al. | |
| 2016/0104514 A1 | 4/2016 | Burnett et al. | |

* cited by examiner

*Primary Examiner* — Nabil Hindi
(74) *Attorney, Agent, or Firm* — Hollingsworth Davis, LLC

(57) ABSTRACT

A temperature compensation equation is generated during manufacture of a heat-assisted magnetic recording (HAMR) disk drive using initial total currents supplied to a laser diode of the disk drive at different initial operating temperatures. The total currents represent currents for recording data to or erasing data from the medium. The temperature compensation equation is stored in the disk drive, and updated, during field operation, using a subsequent total current associated with an operating temperature differing from the initial operating temperatures. The total current supplied to the laser diode for a subsequent write operation is adjusted using the updated temperature compensation equation in response to the operating temperature at the time of the subsequent write operation.

20 Claims, 10 Drawing Sheets

IN-FIELD LASER CALIBRATION FOR HEAT-ASSISTED MAGNETIC RECORDING HEAD USING TEMPERATURE COMPENSATION EQUATION

SUMMARY

Various embodiments are directed to a method comprising generating, during manufacture of a heat-assisted magnetic recording (HAMR) disk drive, a temperature compensation equation using initial total currents supplied to a laser diode of the disk drive at different initial operating temperatures. The total currents represent currents for recording data to or erasing data from the medium. The method comprises storing the temperature compensation equation in the disk drive, and updating, during field operation, the temperature compensation equation using a subsequent total current associated with an operating temperature differing from the initial operating temperatures. The method also comprises adjusting, using the updated temperature compensation equation, the total current supplied to the laser diode for a subsequent write operation in response to the operating temperature at the time of the subsequent write operation.

Other embodiments are directed to an apparatus comprising a slider of a HAMR disk drive movable relative to a magnetic recording medium. The slider comprises a writer, a reader, a near-field transducer, and an optical waveguide for communicating light from a laser diode to the near-field transducer. A temperature sensor is disposed in the disk drive and configured to measure an operating temperature. A controller of the disk drive is coupled to the slider and the temperature sensor. The controller is configured to store a temperature compensation equation in a memory of the disk drive. The temperature compensation equation characterizes total currents supplied to the laser diode of the disk drive at different initial operating temperatures. The total currents represent currents for recording data to or erasing data from the medium. The controller is also configured to update, during field operation, the temperature compensation equation using a subsequent total current associated with an operating temperature differing from the initial operating temperatures. The controller is further configured to adjust, using the updated temperature compensation equation, the total current supplied to the laser diode for a subsequent write operation in response to the operating temperature at the time of the subsequent write operation.

The above summary is not intended to describe each disclosed embodiment or every implementation of the present disclosure. The figures and the detailed description below more particularly exemplify illustrative embodiments.

BRIEF DESCRIPTION OF THE DRAWINGS

Throughout the specification reference is made to the appended drawings, where like reference numerals designate like elements, and wherein.

The figures are not necessarily to scale. Like numbers used in the figures refer to like components. However, it will be understood that the use of a number to refer to a component in a given figure is not intended to limit the component in another figure labeled with the same number.

DETAILED DESCRIPTION

The present disclosure relates to heat-assisted magnetic recording, which can be used to increase areal data density of magnetic media. HAMR may also be referred to as energy-assisted magnetic recording (EAMR), thermally-assisted magnetic recording (TAMR), and thermally-assisted recording (TAR). In a HAMR device, information bits are recorded in a storage layer at elevated temperatures in a specially configured magnetic media. The use of heat can overcome superparamagnetic effects that might otherwise limit the areal data density of the media. As such, HAMR devices may include magnetic write heads for delivering electromagnetic energy to heat a small confined media area (spot size) at the same time the magnetic write head applies a magnetic field to the media for recording.

A HAMR read/write element, sometimes referred to as a slider, recording head, read head, write head, read/write head, etc., includes magnetic read and write transducers similar to those on current hard drives. For example, data may be read by a magnetoresistive sensor that detects magnetic fluctuations of a magnetic media as it moves underneath the sensor. Data is written to the magnetic media by a write coil that is magnetically coupled to a write pole. The write pole changes magnetic orientation in regions of the media as it moves underneath the write pole in response to an energizing current applied to the write coil. A HAMR slider also includes a source of energy, such as a laser diode, to heat the media while it is being written to by the write pole. An optical delivery path is integrated into the HAMR slider to deliver the energy to the surface of the media.

The optical delivery path of a HAMR slider may include a plasmonic transducer proximate a media-facing surface (e.g., air-bearing surface, contact surface). The plasmonic transducer shapes and transmits the energy to a small region on the medium. The plasmonic transducer is sometimes referred to as a near-field transducer (NFT), optical antenna, surface plasmon resonator, etc., and may include a plasmonic metal such as gold, silver, copper, aluminum, etc., and alloys thereof. The plasmonic transducer for a HAMR device is very small (e.g., on the order of 0.1 to a few light wavelengths, or any value therebetween) and creates a localized region of high power density in the media through an electromagnetic interaction. This results in a high temperature rise in a small region on the media, with the region reaching or exceeding the Curie temperature having dimensions less than 100 nm (e.g., ~50 nm).

Figure 1:
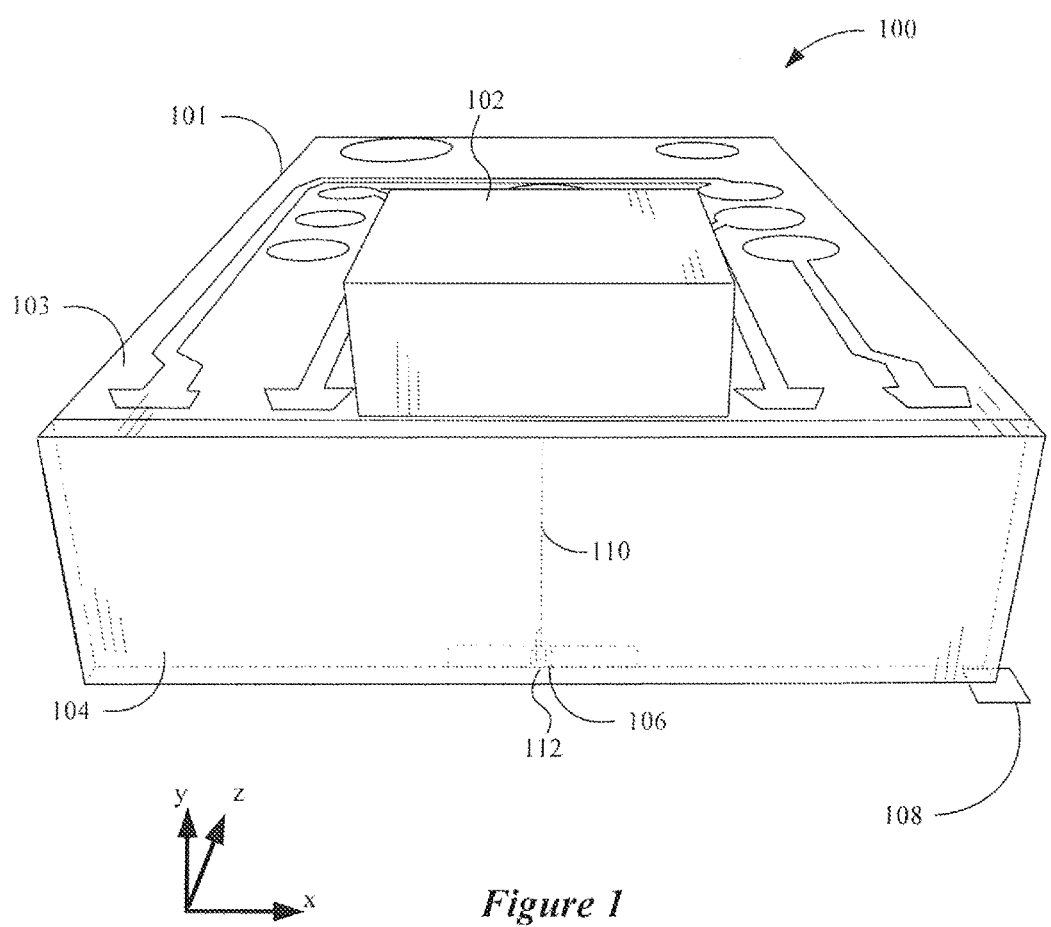
FIG. 1 is a perspective view of a hard drive slider configured for heat-assisted magnetic recording (HAMR) in accordance with embodiments described herein.

With reference to FIG. 1, a perspective view shows a HAMR slider assembly 100 according to a representative embodiment. The slider assembly 100 includes a laser diode 102 located on input surface 103 of a slider body 101. In this example, the input surface 103 is a top surface, which is located opposite to a media-facing surface 108 that is positioned over a surface of a recording media (not shown) during device operation. The media-facing surface 108 faces and is held proximate to the moving media surface while reading and writing to the media. The media-facing surface 108 may be configured as an air-bearing surface (ABS) that maintains separation from the media surface via a thin layer of air.

The laser diode 102 delivers light to a region proximate a HAMR read/write head 106, which is located near the media-facing surface 108. The energy is used to heat the recording media as it passes by the read/write head 106. Optical coupling components are formed integrally within the slider body 101 (near a trailing edge surface 104 in this example) and function as an optical path that delivers energy from the laser diode 102 to the recording media via a near-field transducer 112. The near-field transducer 112 is near the read/write head 106 and causes heating of the media during recording operations.

The laser diode 102 in this example may be configured as either an edge-emitting laser or surface-emitting laser. Generally, the edge-emitting laser emits light from near a corner edge of the laser and a surface emitting laser emits light in a direction perpendicular to a surface of the laser body, e.g., from a point near a center of the surface. An edge-emitting laser may be mounted on the top surface 103 of the slider body 101 (e.g., in a pocket or cavity) such that the light is emitted in a direction parallel to (or at least non-perpendicular to) the media-facing surface. A surface-emitting or edge-emitting laser in any of these examples may be directly coupled to the slider body 101, or via an intermediary component such as a submount (not shown). A submount can be used to orient an edge-emitting laser so that its output is directly downwards (negative y-direction in the figure).

While the example in FIG. 1 shows a laser diode 102 directly mounted to the slider body 101, the waveguide system 110 discussed herein may be applicable to any type of light delivery configuration. For example, a laser may be mounted on the trailing edge surface 104 instead of the top surface 103. In another configuration known as free-space light delivery, a laser may be mounted external to the slider 100, and coupled to the slider by way of optic fiber and/or waveguide. An input surface of the slider body 101 may include a grating or other coupling feature to receive light from the laser via the optic fiber and/or waveguide.

Figure 2:
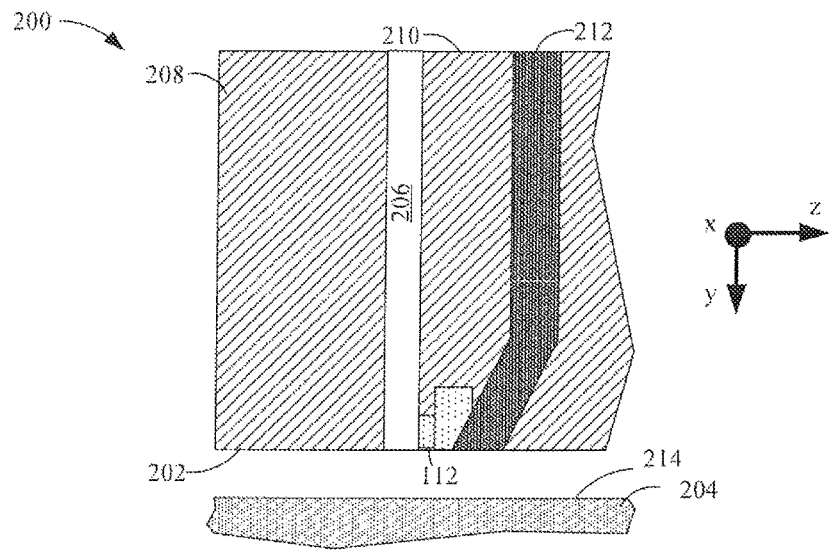
FIG. 2 is a cross-sectional view showing details of a HAMR slider according to various implementations.

With reference now to FIG. 2, a cross-sectional view shows details of a HAMR apparatus 200 according to an example embodiment. Near-field transducer 112 is located proximate a media-facing surface 202 (e.g., ABS), which is held near a magnetic recording media 204 during device operation. In the orientation of FIG. 2, the media-facing surface 202 is arranged parallel to the x-z plane. A waveguide core 206 may be disposed proximate the NFT 112, which is located at or near the media writing surface 214.

The waveguide core 206 is surrounded by cladding layers 208, 210. The waveguide core 206 and cladding layers 208, 210 may be made from dielectric materials. Generally, the dielectric materials are selected so that the refractive index of the waveguide core layer 206 is higher than refractive indices of the cladding layers 208, 210. This arrangement of materials facilitates efficient propagation of light through the waveguide. Light is delivered from the waveguide core 206 along the negative y-direction where it is coupled to the NFT 112. The NFT 112 delivers surface plasmon enhanced, near-field electromagnetic energy along the y-axis where it exits at the media writing surface 214. This may result in a highly localized hot spot (not shown) on the media surface 214 when the media 204 placed in close proximity to surface 202 of the apparatus 200. Further illustrated in FIG. 2 is a write pole 212 of the read/write head that is located alongside the NFT 112. The write pole 212 generates a magnetic field (e.g., perpendicular field) used in changing the magnetic orientation of the hotspot during writing.

Figure 3:
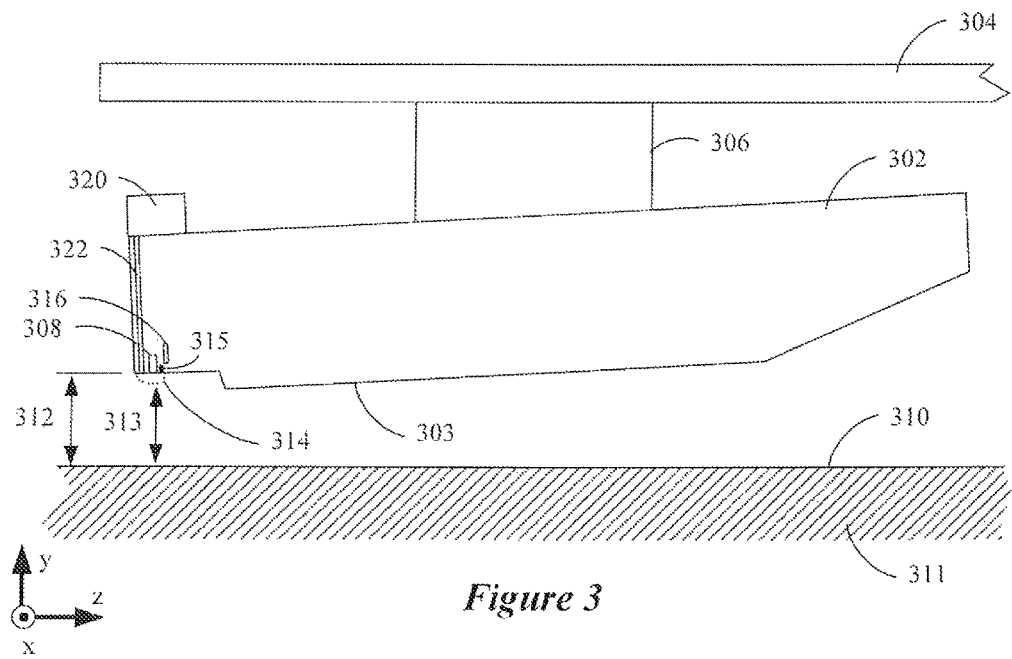
FIG. 3 illustrates a HAMR slider in accordance with some aspects described herein.

FIG. 3 shows a side view of a read/write transducer 302 configured for heat-assisted magnetic recording according to a representative embodiment. The read/write transducer 302 may be used in a magnetic data storage device, e.g., a hard disk drive. The read/write transducer 302 may also be referred to herein as a slider, read/write head, recording head, etc. The read/write transducer 302 is coupled to an arm 304 by way of a suspension 306 that allows some relative motion between the read/write transducer 302 and arm 304. The read/write transducer 302 includes read/write transducers 308 at a trailing edge that are held proximate to a surface 310 of a magnetic recording medium 311, e.g., magnetic disk. The read/write transducer 302 further includes a laser 320 and a waveguide 322. The waveguide 322 delivers light from the laser 320 to components (e.g., a near-field transducer) near the read/write transducers 308.

When the read/write transducer 302 is located over surface 310 of recording medium 311, a flying height 312 is maintained between the read/write transducer 302 and the surface 310 by a downward force of arm 304. This downward force is counterbalanced by an air cushion that exists between the surface 310 and an air bearing surface 303 (also referred to herein as a "media-facing surface") of the read/write transducer 302 when the recording medium 311 is rotating. It is desirable to maintain a predetermined slider flying height 312 over a range of disk rotational speeds during both reading and writing operations to ensure consistent performance. Region 314 is a "close point" of the read/write transducer 302, which is generally understood to be the closest spacing between the read/write transducers 308 and the magnetic recording medium 311, and generally defines the head-to-medium spacing 313.

To account for both static and dynamic variations that may affect slider flying height 312, the read/write transducer 302 may be configured such that a region 314 of the read/write transducer 302 can be configurably adjusted during operation in order to finely adjust the head-to-medium spacing 313. This is shown in FIG. 3 by a dotted line that represents a change in geometry of the region 314. In this example, the geometry change may be induced, in whole or in part, by an increase or decrease in temperature of the region 314 via one or more heaters 316. A thermal sensor 315 is shown situated at or near the close point 314

(e.g., adjacent the read/write transducers 308, such as near the near-field transducer) or can be positioned at other location of the ABS 303.

Figure 4:
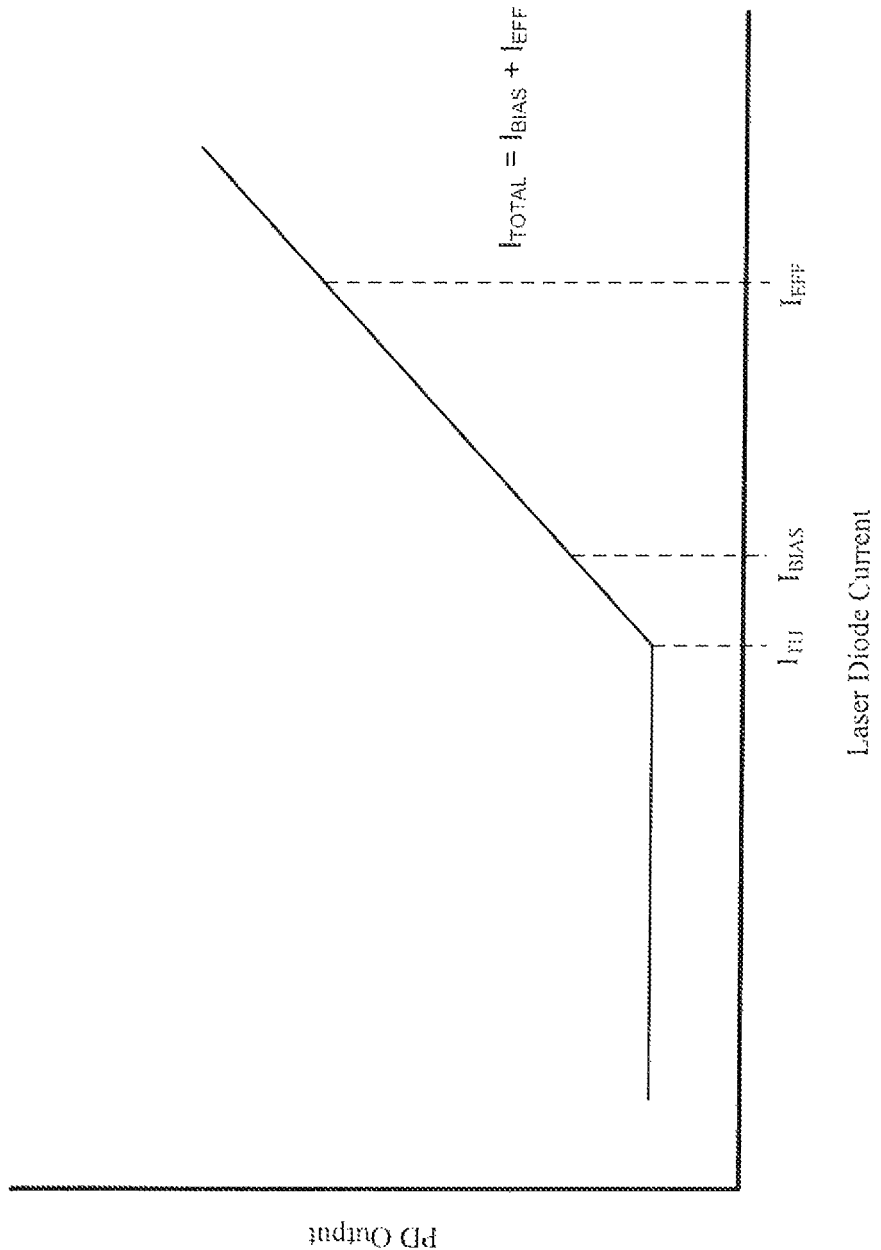
FIG. 4 is a generalized graph characterizing output optical power of a laser diode of a HAMR slider in response to current supplied to the laser diode.

Turning now to FIG. 4, there is illustrated a generalized graph characterizing output optical power of a laser diode of a HAMR slider (e.g., as measured by a photodiode) in response to current supplied to the laser diode. The laser diode is in a non-conducting state until a threshold current, $I_{TH}$, is reached. At $I_{TH}$, the laser diode begins to conduct or lase. When recording data on a magnetic recording medium, the current supplied to the laser diode is increased to $I_{EFF}$ (referred to as effective current). At $I_{EFF}$, the current supplied to the laser diode is sufficient to facilitate an increase in media temperature to the Curie Temperature for recording data on the medium. A current $I_{BIAS}$ represents a current supplied to the laser diode that is lower than $I_{EFF}$. At $I_{BIAS}$, the current supplied to the laser diode (bias current) is not sufficient to facilitate recording of data. $I_{BIAS}$ is typically set between $I_{EFF}$ and $I_{TH}$, but can also be set lower than $I_{TH}$. (not shown). As with $I_{TH}$, $I_{BIAS}$ changes as the laser diode temperature changes. The laser diode current is set at $I_{BIAS}$ prior to performing a write or when performing various non-recording tasks, such as when performing a seek or when the slider is over servo wedges between writes.

The sum of $I_{BIAS}$ and $I_{EFF}$ is referred to as $I_{TOTAL}$ (total current), which is the total current applied to the laser diode during write operations. In some embodiments, $I_{TOTAL}$ is achieved by adjusting $I_{EFF}$ while $I_{BIAS}$ is fixed. In other embodiments, $I_{TOTAL}$ is achieved by adjusting $I_{EFF}$ and adjusting $I_{BIAS}$. $I_{BIAS}$ can be adjusted based on the output of a photodiode, the output of a thermal sensor (e.g., a dual-ended temperature coefficient of resistance sensor), or by some other means or algorithm.

Figure 5:
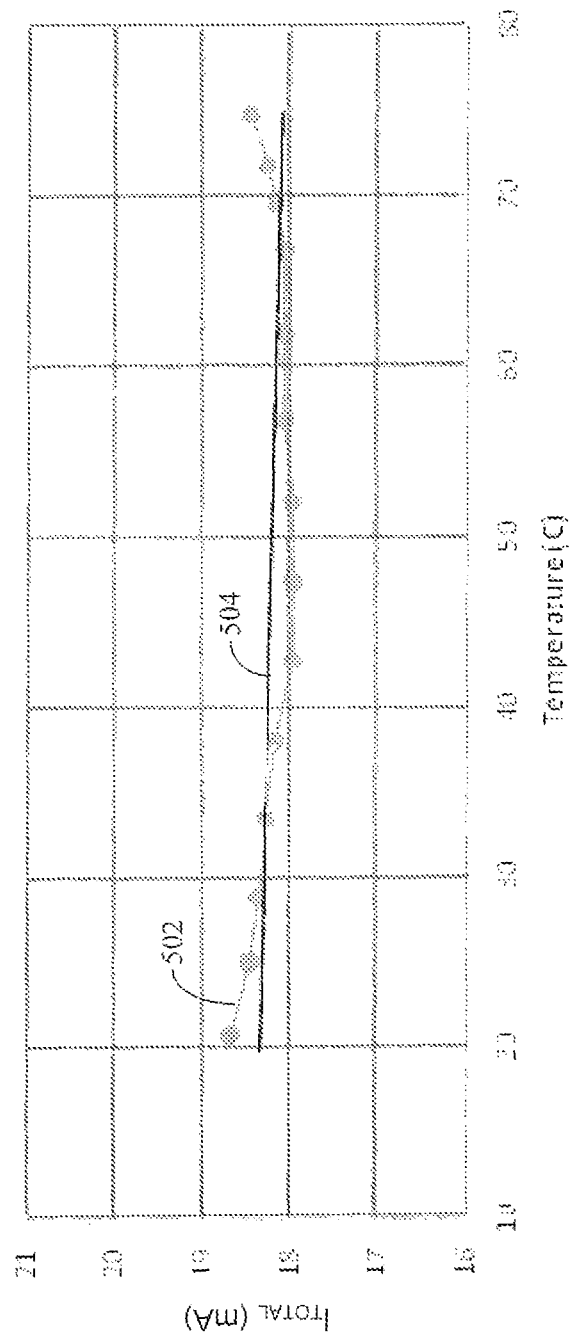
FIG. 5 is a graph showing how total current, $I_{TOTAL}$, supplied to a laser diode of a HAMR slider changes non-linearly across temperature.

It is been found that the laser diode current $I_{TOTAL}$ is non-linear across temperature. The amount of non-linearity of $I_{TOTAL}$ is head and media dependent. As such, a global compensation approach cannot be applied. FIG. 5 is a graph showing how $I_{TOTAL}$ 502 changes non-linearly across temperature. More particularly, FIG. 5 shows that $I_{TOTAL}$ 502 varies non-linearly between about 18 and 18.7 mA across a temperature range of 20° to 75° C. The magnitude of $I_{TOTAL}$ non-linearity increases at the extremes (low and high) of the temperature range. FIG. 5 also shows a straight-line average $I_{TOTAL}$ 504 derived from performing a linear regression on the $I_{TOTAL}$ data points. It can be appreciated that using the straight-line average $I_{TOTAL}$ 504 to set $I_{TOTAL}$ of the laser diode at a given operating temperature would result in a suboptimal current supplied to the laser diode for recording.

Embodiments of the disclosure are directed to generating a temperature compensation equation that characterizes the total current, $I_{TOTAL}$, supplied to a laser diode of a HAMR slider across a range of operating temperatures of the disk drive. The temperature compensation equation is preferably at least a second order polynomial equation (e.g., a quadratic equation). In some embodiments, the temperature compensation equation can be a third or fourth order polynomial equation (continuous or piecewise). An initial temperature compensation equation characterizing the total current, $I_{TOTAL}$, is typically established at the time of disk drive manufacture for a minimal number (e.g., 2) of operating temperatures. The temperature compensation equation for selecting the total current, $I_{TOTAL}$, supplied to the laser diode is updated during field operation of the HAMR disk drive. For example, the temperature compensation equation can be updated during field operation in response to a difference between the current operating temperature and previous operating temperatures within a temperature range covered by the temperature compensation equation.

Figure 6:
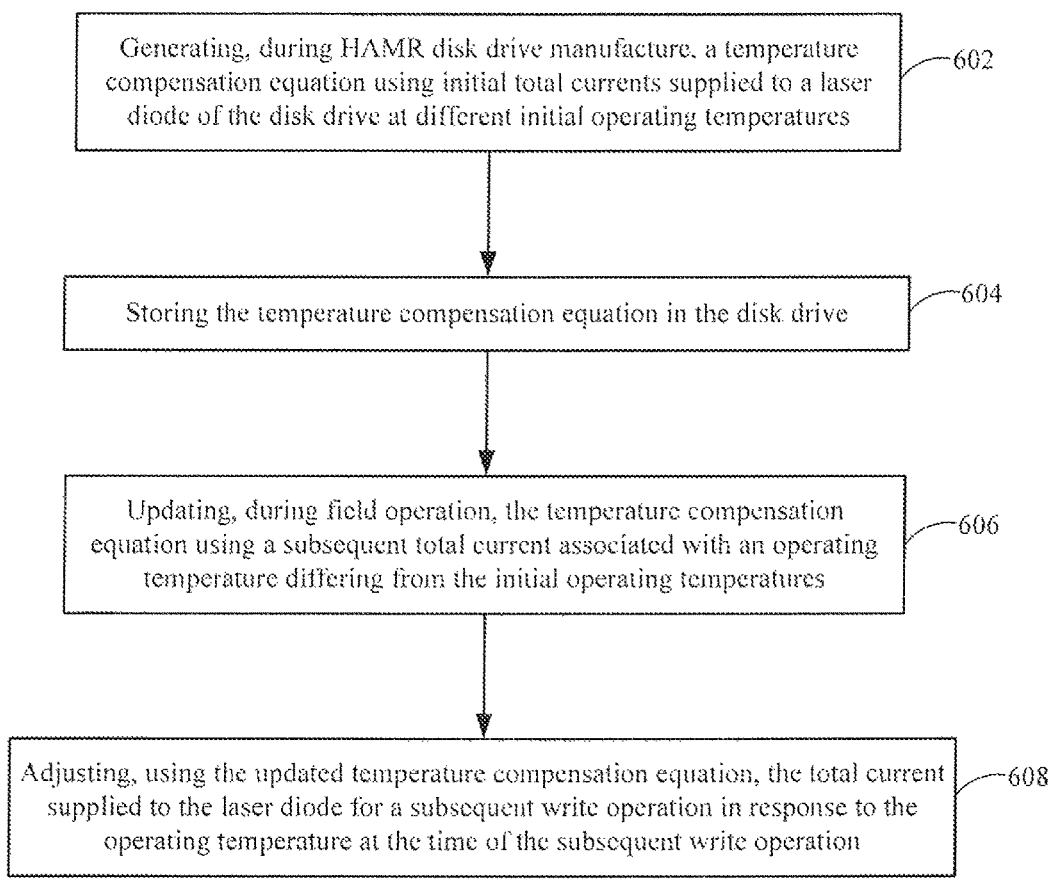
FIG. 6 illustrates a method of generating and updating a temperature compensation equation that characterizes the total current, $I_{TOTAL}$, in accordance with various embodiments.

FIG. 6 illustrates a method of generating a temperature compensation equation that characterizes the total current, $I_{TOTAL}$, in accordance with various embodiments. The method according to FIG. 6 involves generating 602, during HAMR disk drive manufacture, a temperature compensation equation using initial total currents supplied to a laser diode of the disk drive at a minimal number of different initial operating temperatures. For example, the temperature compensation equation generated during disk drive manufacture can be based on two initial operating temperatures (e.g., 20° C. and 50° C.). The method involves storing 604 the temperature compensation equation in the disk drive. The method also involves updating 606, during field operation, the temperature compensation equation using a subsequent total current associated with an operating temperature differing from the initial operating temperatures or initial operating temperature range. The method further involves adjusting 608, using the updated temperature compensation equation, the total current supplied to the laser diode for a subsequent write operation in response to the operating temperature at the time of the subsequent write operation. It is understood that the method shown in FIG. 6 is performed for each recording head of a HAMR disk drive.

Limiting the number of operating temperatures when generating the initial temperature compensation equation in the factory is important from a manufacturing cost/time standpoint. Developing a temperature compensation equation during manufacturing using multi-temperature testing across a wide range of operating temperatures is very expensive and time consuming. Also, conventional production equipment has a limited temperature range which is significantly smaller than the operating temperature range specified for disk drive product. As such, it is not presently possible to develop, at the time of disk drive manufacture, a temperature compensation equation for characterizing the total current, $I_{TOTAL}$, across the full range of operating temperatures specified for HAMR disk drive product. Because the temperature compensation equation is updated in the field according to embodiments of the disclosure, the total current, $I_{TOTAL}$, can be characterized across the full range of operating temperatures experienced by the disk drive.

Figure 7:
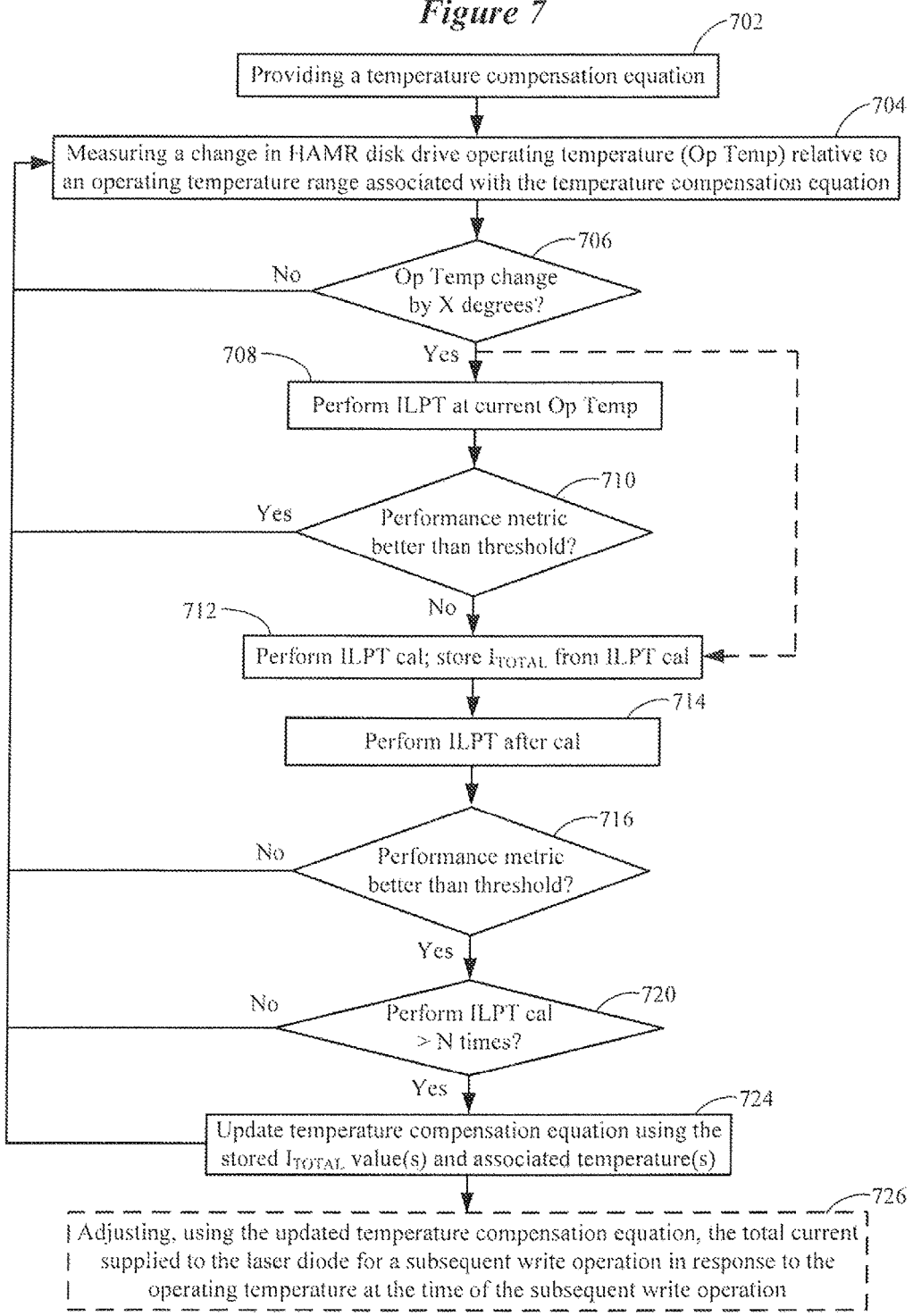
FIG. 7 illustrates a method of updating a temperature compensation equation that characterizes the total current, $I_{TOTAL}$, in accordance with various embodiments.

FIG. 7 illustrates a method of updating a temperature compensation equation that characterizes the total current, $I_{TOTAL}$, during field operation of a disk drive in accordance with various embodiments. The method according to FIG. 7 involves providing 702 a temperature compensation equation. The temperature compensation equation can be an initial temperature compensation equation generated at the time of manufacture or a temperature compensation equation that has been updated in the field. In either case, the temperature compensation equation characterizes total currents for two or more operating temperatures of a HAMR disk drive that define an operating temperature range.

The method of FIG. 7 involves measuring 704 a change in the disk drive operating temperature (Op Temp) relative to an operating temperature range associated with the temperature compensation equation. For example, the temperature compensation equation provided in block 702 may characterize two or more total currents within an operating temperature range of 20° C. and 50° C. The change in disk drive operating temperature measured in block 704 is made relative to the limits (e.g., 20° C. and 50° C.) of the operating temperature range associated with the temperature compensation equation.

During operation of the disk drive in the field, the operating temperature of the disk drive is measured. The disk drive temperature can be measured continuously or periodically (e.g., every 5, 10, 30 minutes, hourly). A check 706 is made to determine if the operating temperature has changed by X degrees or more relative to the closest limit of the operating temperature range associated with the temperature compensation equation. The variable X is typically an integer between 2 and 8, such as 5, but can also be a real number. If the operating temperature has not changed by X degrees or more, processing returns to block 704. If the operating temperature has changed by X degrees or more, an in-field laser performance test (ILPT) is performed 708 at the current operating temperature.

According to some embodiments, an ILPT involves a test of the laser diode's performance. For example, the ILPT can involve writing data to a track of a magnetic recording medium, reading the data, and measuring a metric of writeability, such as BER. As another example, the output optical power of the laser diode can be measured, such as by use of a photodetector or a bolometer. It is understood that performance metrics other than BER and output optical power can be measured in block 708. If, as tested at block 710, the performance metric is better than a predetermined threshold (e.g., a BER threshold or an output optical power threshold), no changes are made to laser diode operation or to the temperature compensation equation, and processing returns to block 704. If the performance metric is poorer than the predetermined threshold, an ILPT calibration is performed 712. In some embodiments, blocks 708 and 710 are not included (as indicated by the dashed line), and an ILPT calibration is performed 712 in response to determining (at block 706) that the operating temperature has changed by X degrees or more relative to the closest limit of the operating temperature range associated with the temperature compensation equation.

In some embodiments, an ILPT calibration 712 involves writing tracks of data while varying the total current, $I_{TOTAL}$, between a minimum and maximum value, and measuring a performance metric (e.g., BER) for each of the total current values. For example, the total current, $I_{TOTAL}$, can be swept at increments between 100 and 120 DAC values. A DAC value represents a value of a digital-to-analog converter output. For example, a particular $I_{TOTAL}$ DAC value can correspond to a particular amount of current (in mA) supplied to the laser diode. DAC values are generally incremented and decremented in fixed step sizes. The ILPT calibration returns a total current, $I_{TOTAL}$, that has an acceptable (e.g., maximum, optimum or otherwise useful) performance metric for the current operating temperature (e.g., a BER better than a predetermined threshold). The total current, $I_{TOTAL}$, returned by the ILPT calibration is stored in a memory of the disk drive.

After the ILPT calibration 712, a performance test is performed 714 using the total current, $I_{TOTAL}$, obtained from the ILPT calibration. The ILPT 714 can measure a performance metric such as BER or output optical power of the laser diode. If the performance metric is better than a predetermined threshold, as is tested at block 716, processing proceeds to block 720. If the performance metric is poorer than the predetermined threshold, the total current, $I_{TOTAL}$, returned by the ILPT calibration 712 is discarded and processing returns to block 704.

The total current, $I_{TOTAL}$, returned by the ILPT calibration 712 can also serve as a performance metric that is evaluated at block 716. The ILPT 714 can determine if the total current, $I_{TOTAL}$, returned by the ILPT calibration 712 is an acceptable current. For example, if the total current, $I_{TOTAL}$, returned by the ILPT calibration 712 changes by less than a predetermined amount (e.g., <10% or 20%) relative to the presently-used total current, $I_{TOTAL}$, then the total current, $I_{TOTAL}$, returned by the ILPT calibration can be considered acceptable, in which case processing proceeds to block 720. If the total current, $I_{TOTAL}$, returned by the ILPT calibration 712 changes by more than the predetermined amount relative to the presently-used total current, $I_{TOTAL}$, then the total current, $I_{TOTAL}$, returned by the ILPT calibration can be considered unacceptable, in which case the total current, $I_{TOTAL}$, returned by the ILPT calibration 712 is discarded and processing returns to block 704.

In some embodiments, a check 720 is made to determine how many times (N) ILPT calibration has been performed since the last update to the temperature compensation equation. N is an integer equal to or greater than 1 (e.g., N=1, 2 or 3). If ILPT calibration has not been performed more than N times, processing returns to block 704. If ILPT calibration has been performed more than N times, the temperature compensation equation is updated 724 using the stored values of total current, $I_{TOTAL}$, and associated temperatures from the previous ILPT calibrations. In other embodiments, the temperature compensation equation is updated after each ILPT calibration (e.g., block 720 is excluded). During operation of the disk drive in the field, the updated temperature compensation equation can be used to adjust 726 the total current, $I_{TOTAL}$, applied to the laser diode for a subsequent write operation in response to the operating temperature at the time of the subsequent write operation. It is understood that the method shown in FIG. 7 is performed for each recording head of a HAMR disk drive.

Figure 8:
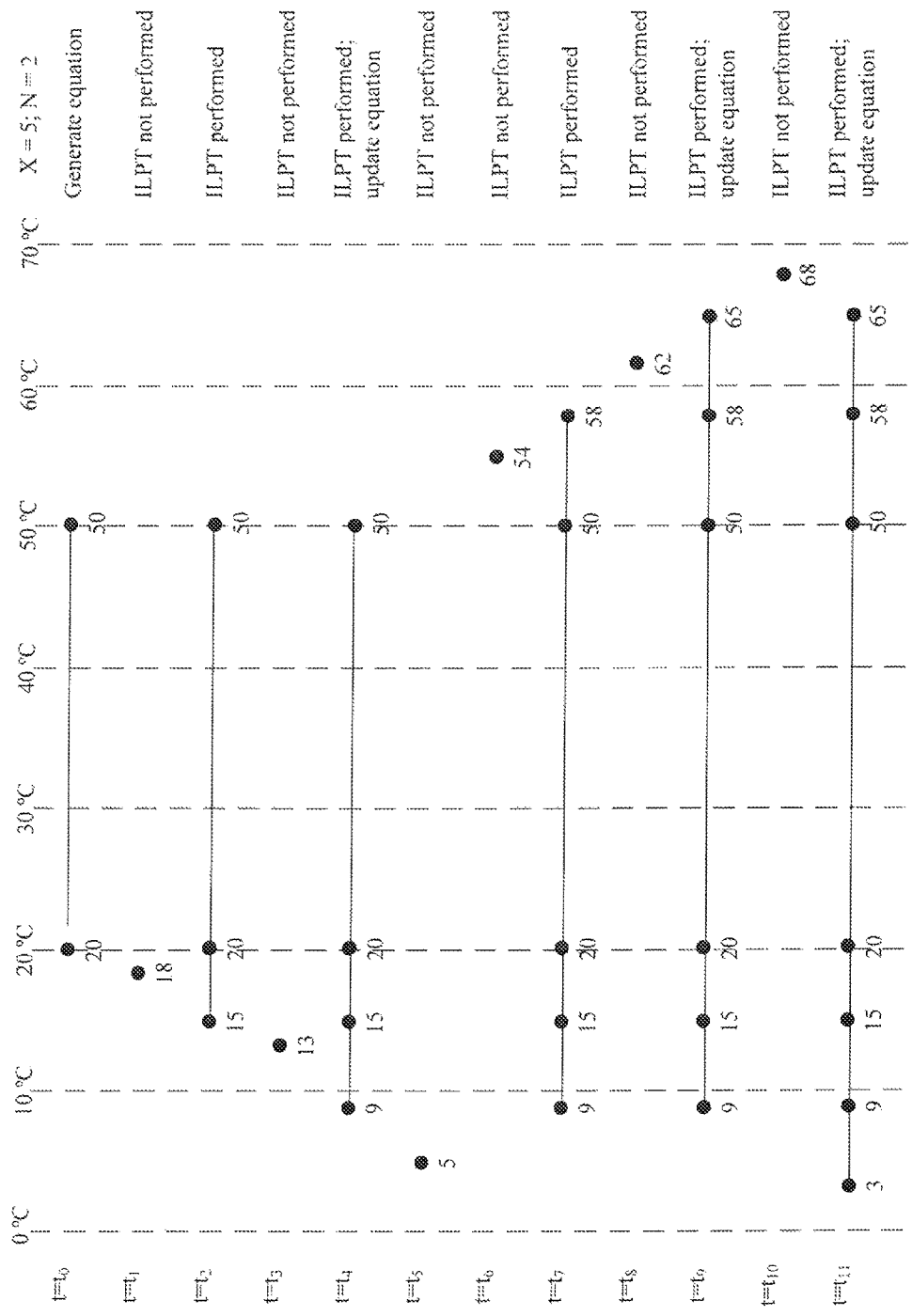
FIG. 8 illustrates a process of updating a temperature compensation equation that characterizes the total current, $I_{TOTAL}$, during field operation of a particular HAMR disk drive in accordance with various embodiments.

FIG. 8 illustrates a process of updating a temperature compensation equation that characterizes the total current, $I_{TOTAL}$, during field operation of a particular HAMR disk drive in accordance with various embodiments. In the illustrative example shown in FIG. 8, it is assumed that the specified temperature range for disk drive operation is 5-65° C. As such, is it desired that the temperature compensation equation be updated over time in the field to characterize the total current, $I_{TOTAL}$, over the entire specified temperature range. It is also assumed that an ILPT is self-invoked by the disk drive in the field for every X degree Celsius of operating temperature change, such that X equals 5° C. It is further assumed that once the disk drive has performed N (e.g., N=2) self-invoked ILPT calibrations, a controller or processor of the disk drive updates the temperature compensation equation, which is at least a second order polynomial equation. As previously discussed, the temperature compensation equation can be a third or a fourth order polynomial equation.

At a time $t=t_0$, an initial temperature compensation equation is generated at the time of disk drive manufacture. In this illustrative example, a total current, $I_{TOTAL}$, is determined at two different temperatures, 20° C. and 50° C. The total current at each of the two different temperatures results in an acceptable (e.g., maximum, optimal or otherwise useful) performance metric (e.g., BER better than a predetermined threshold). The temperature compensation equation is generated using the total currents at these two different temperatures. It is understood that the total currents associated with more than two temperatures can be used to generate the initial temperature compensation equation during manufacture. The initial temperature compensation equation is stored in the disk drive and subject to updating in the field. It can be seen that the temperatures associated with the initial temperatures compensation equation range from 20° C. to 50° C. Typically, the temperature compensation equation is not updated (but can be updated in some embodiments) for operating temperatures that fall within the temperature range associated with the initial temperatures compensation equation.

At time $t=t_1$, the operating temperature of the disk drive is measured at 18° C. The lower limit of the temperature range of 20-50° C. is compared to the operating temperature at time $t=t_1$. Because the difference between 20° C. and 18° C. is less than 5° C. (X=5), an ILPT is not performed. At time $t=t_2$, the operating temperature of the disk drive is measured at 15° C. The lower limit of the temperature range of 20-50° C. is compared to the operating temperature at time $t=t_2$. Because the difference between 20° C. and 15° C. is equal to 5° C., an ILPT is performed. Assuming an ILPT calibration is performed (e.g., BER better than a predetermined threshold at 15° C.), a total current, $I_{TOTAL}$, for 15° C. is returned. In some embodiments, the temperature compensation equation is updated after each ILPT calibration is performed. In other embodiments, as in the case of FIG. 8, the temperature compensation equation is updated after N (e.g., N=2) ILPT calibrations have been performed. It can be seen that at time $t=t_2$, the temperature range has increased from 20-50° C. to 15-50° C.

At time $t=t_3$, the operating temperature of the disk drive is measured at 13° C. The lower limit of the temperature range of 15-50° C. is compared to the operating temperature at time $t=t_3$. Because the difference between 15° C. and 13° C. is less than 5° C., an ILPT is not performed. At time $t=t_4$, the operating temperature of the disk drive is measured at 9° C. The lower limit of the temperature range of 15-50° C. is compared to the operating temperature at time $t=t_4$. Because the difference between 15° C. and 9° C. is greater than 5° C., an ILPT is performed. Assuming an ILPT calibration is performed (e.g., BER is better than a predetermined threshold at 9° C.), a total current, $I_{TOTAL}$, for 9° C. is returned. It can be seen that ILPT calibrations were performed at times $t=t_2$ and $t=t_4$. Assuming N is set to 2, the temperature compensation equation is updated at time $t=t_4$ using the total currents obtained at 9° C., 15° C., 20° C., and 50° C. The temperature range associated with the updated temperature compensation equation is increased from 15-50° C. to 9-50° C. at time $t=t_4$. At time $t=t_5$, the operating temperature of the disk drive is measured at 5° C. The lower limit of the temperature range of 9-50° C. is compared to the operating temperature at time $t=t_5$. Because the difference between 9° C. and 5° C. is less than 5° C., an ILPT is not performed.

At time $t=t_6$, the operating temperature of the disk drive is measured at 54° C. The upper limit of the temperature range of 9-50° C. is compared to the operating temperature at time $t=t_6$. Because the difference between 54° C. and 50° C. is less than 5° C., an ILPT is not performed. At time $t=t_7$, the operating temperature of the disk drive is measured at 58° C. The upper limit of the temperature range of 9-50° C. is compared to the operating temperature at time $t=t_7$. Because the difference between 58° C. and 50° C. is greater than 5° C., an ILPT is performed. Assuming an ILPT calibration is performed (e.g., BER is better than a predetermined threshold at 58° C.), a total current, $I_{TOTAL}$, for 58° C. is returned. At time $t=t_8$, the operating temperature of the disk drive is measured at 62° C. The upper limit of the temperature range of 9-58° C. is compared to the operating temperature at time $t=t_8$. Because the difference between 62° C. and 58° C. is less than 5° C., an ILPT is not performed.

At time $t=t_9$, the operating temperature of the disk drive is measured at 65° C. The upper limit of the temperature range of 9-58° C. is compared to the operating temperature at time $t=t_9$. Because the difference between 65° C. and 58° C. is greater than 5° C., an ILPT is performed. Assuming an ILPT calibration is performed (e.g., BER is better than a predetermined threshold at 65° C.), a total current, $I_{TOTAL}$, for 65° C. is returned. It can be seen that ILPT calibrations were performed at times $t=t_7$ and $t=t_9$. Assuming N is set to 2, the temperature compensation equation is updated at time $t=t_9$ using the total currents obtained at 9° C., 15° C., 20° C., 50° C., 58° C., and 65° C. The temperature range associated with the updated temperature compensation equation is increased from 9-58° C. to 9-65° C. at time $t=t_9$.

At time $t=t_{10}$, the operating temperature of the disk drive is measured at 68° C. The upper limit of the temperature range of 9-65° C. is compared to the operating temperature at time $t=t_{10}$. Because the difference between 68° C. and 65° C. is less than 5° C., an ILPT is not performed. In some embodiments, an ILPT process is not performed for an operating temperature that exceeds the specified temperature range of the disk drive. In the present example, the specified temperature range is 5-65° C., and the operating temperature at time $t=t_{10}$ exceeds 65° C., in which case ILPT is not performed for the excessively high operating temperature. In other embodiments, an ILPT process can be performed for an operating temperature (e.g., 70° C.) that exceeds the specified temperature range of the disk drive.

For example, and with reference to time $t=t_{11}$, the operating temperature of the disk drive is measured at 3° C. The lower limit of the temperature range of 9-65° C. is compared to the operating temperature at time $t=t_{11}$. Because the difference between 3° C. and 9° C. is greater than 5° C., an ILPT is normally performed. However, the measured operating temperature of 3° C. is outside of the specified temperature range of the disk drive, and an ILPT would not normally be performed (but can be performed in some embodiments). In this illustrative example, an ILPT is performed at time $t=t_{11}$. Assuming an ILPT calibration is performed (e.g., BER is better than a predetermined threshold at 3° C.), a total current, $I_{TOTAL}$, for 3° C. is returned. Because the operating temperature is outside the specified temperature range of the disk drive, the temperature compensation equation is updated at time $t=t_{11}$ using the total currents obtained at 3° C., 9° C., 15° C., 20° C., 50° C., 58° C. and 65° C., irrespective of the value of N. The temperature range associated with the updated temperature compensation equation is increased from 9-65° C. to 3-65° C. at time $t=t_{11}$. It can be seen that the updated temperature compensation equation at time $t-t_{11}$ spans the specified temperature range of the disk drive (e.g., 5-65° C.). As such, the ILPT and temperature compensation equation updating processes in the field can be terminated. In some embodiments, the ILPT and temperature compensation equation updating processes can be performed repeatedly in the field during the life of the HAMR drive, and need not be terminated in the manner described above.

In the illustrative example of FIG. 8, the variable X is a fixed integer of 5° C. In some embodiments, the variable X can vary depending on how far away a measured operating temperature is from the temperature range associated with the temperature compensation equation (e.g., from a mid-point of the temperature range). For example, X can be reduced from 5° C. to 3° C. for operating temperatures that are Y degrees away from a mid-point of the temperature range.

Figure 9:
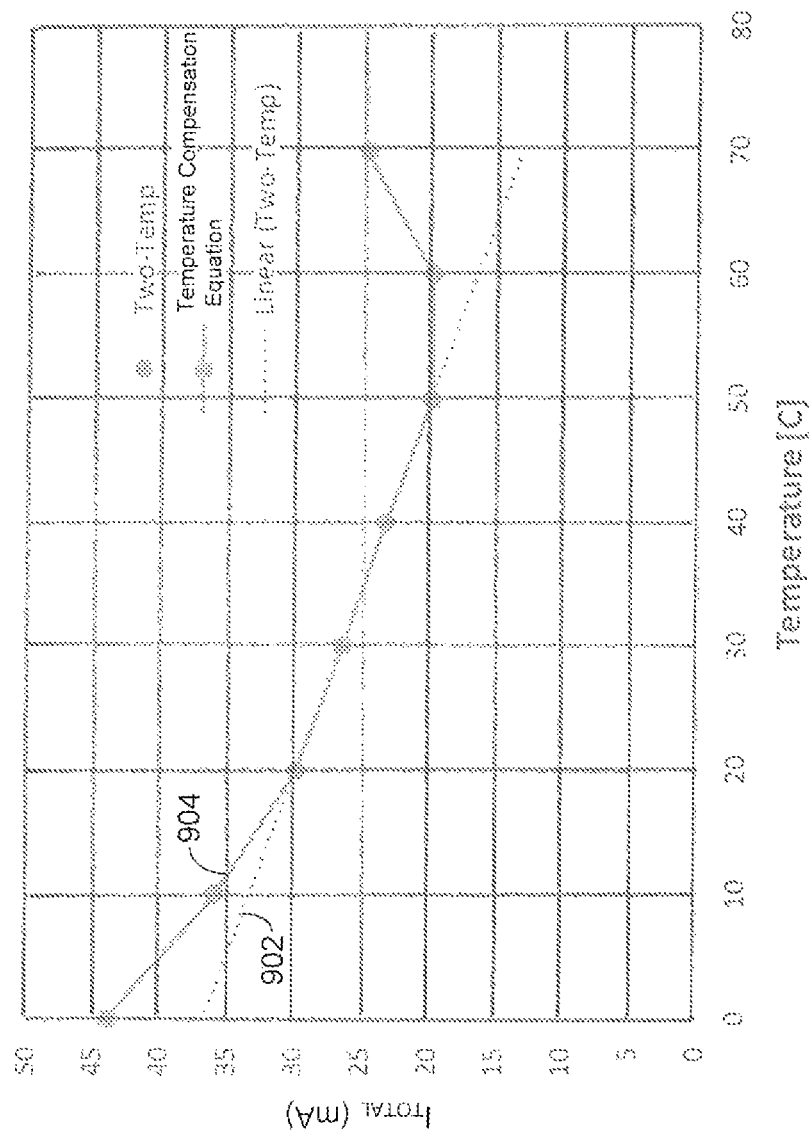
FIG. 9 is a graph showing plots of total current, $I_{TOTAL}$, versus temperature for a conventional laser diode calibration approach and one that uses a temperature compensation equation in accordance with embodiments of the present disclosure.

FIG. 9 is a graph showing plots of total current, $I_{TOTAL}$, versus temperature for a conventional laser diode calibration approach and one that uses a temperature compensation equation in accordance with embodiments of the present disclosure. Plot 902 is a linear extrapolation of $I_{TOTAL}$ values based on two $I_{TOTAL}$ values at 20° C. and 50° C. Plot 904 is based on a temperature compensation equation generated and updated in accordance embodiments of the disclosure. Plot 904 accurately characterizes the non-linearity of $I_{TOTAL}$ for a particular HAMR head and medium, resulting in optimal current being supplied to the laser diode for recording. In contrast, plot 902 poorly characterizes the non-linearity of $I_{TOTAL}$, particularly at low and high operating temperatures, resulting in suboptimal current being supplied to the laser diode for recording.

Figure 10:
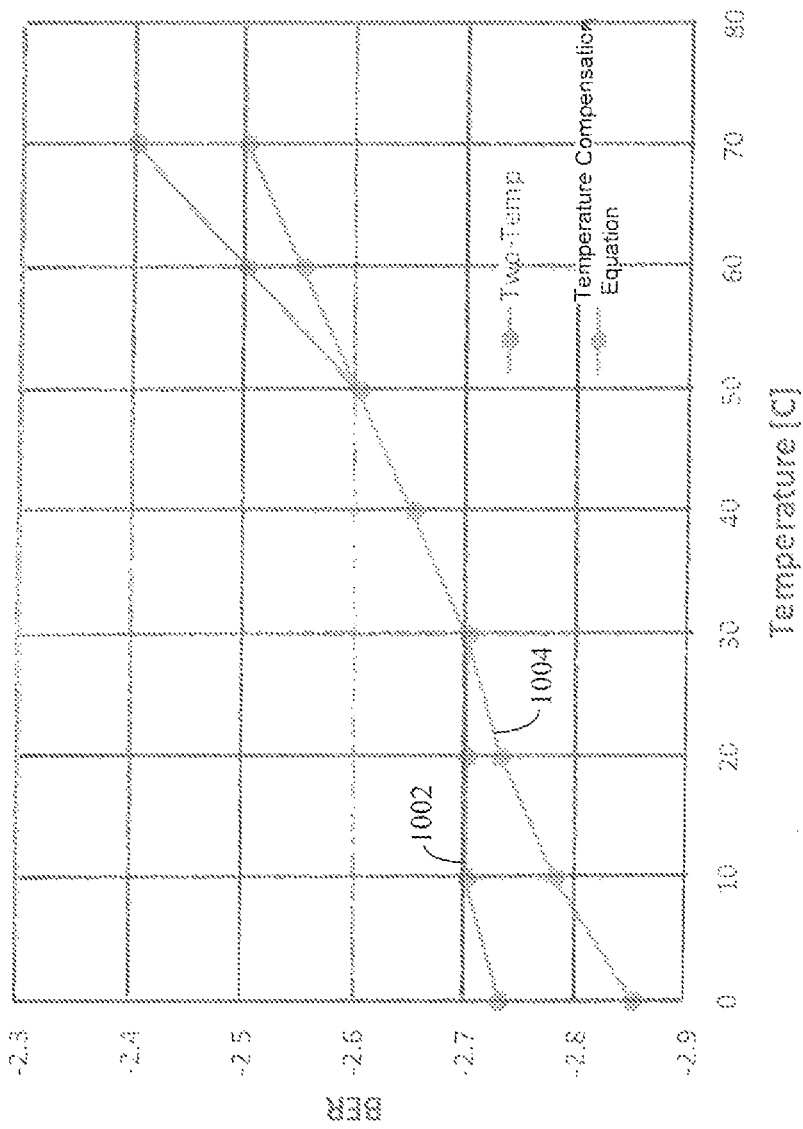
FIG. 10 is a graph showing plots of bit error rate (BER) versus temperature for a conventional laser diode calibration approach and one that uses a temperature compensation equation in accordance with embodiments of the present disclosure.

FIG. 10 is a graph showing plots of bit error rate versus temperature for a conventional laser diode calibration approach and one that uses a temperature compensation equation in accordance with embodiments of the present disclosure. Plot 1002 characterizes the BER resulting from writing data using $I_{TOTAL}$ values produced using the conventional laser diode calibration approach shown FIG. 9 (plot 902). Plot 1004 characterizes the BER resulting from writing data using $I_{TOTAL}$ values produced using the temperature compensation equation approach shown FIG. 9 (plot 904). FIG. 10 demonstrates that writing data using $I_{TOTAL}$ values produced using the temperature compensation equation approach of the present disclosure results in a significantly better BER when compared to a conventional laser diode calibration approach.

Figure 11:
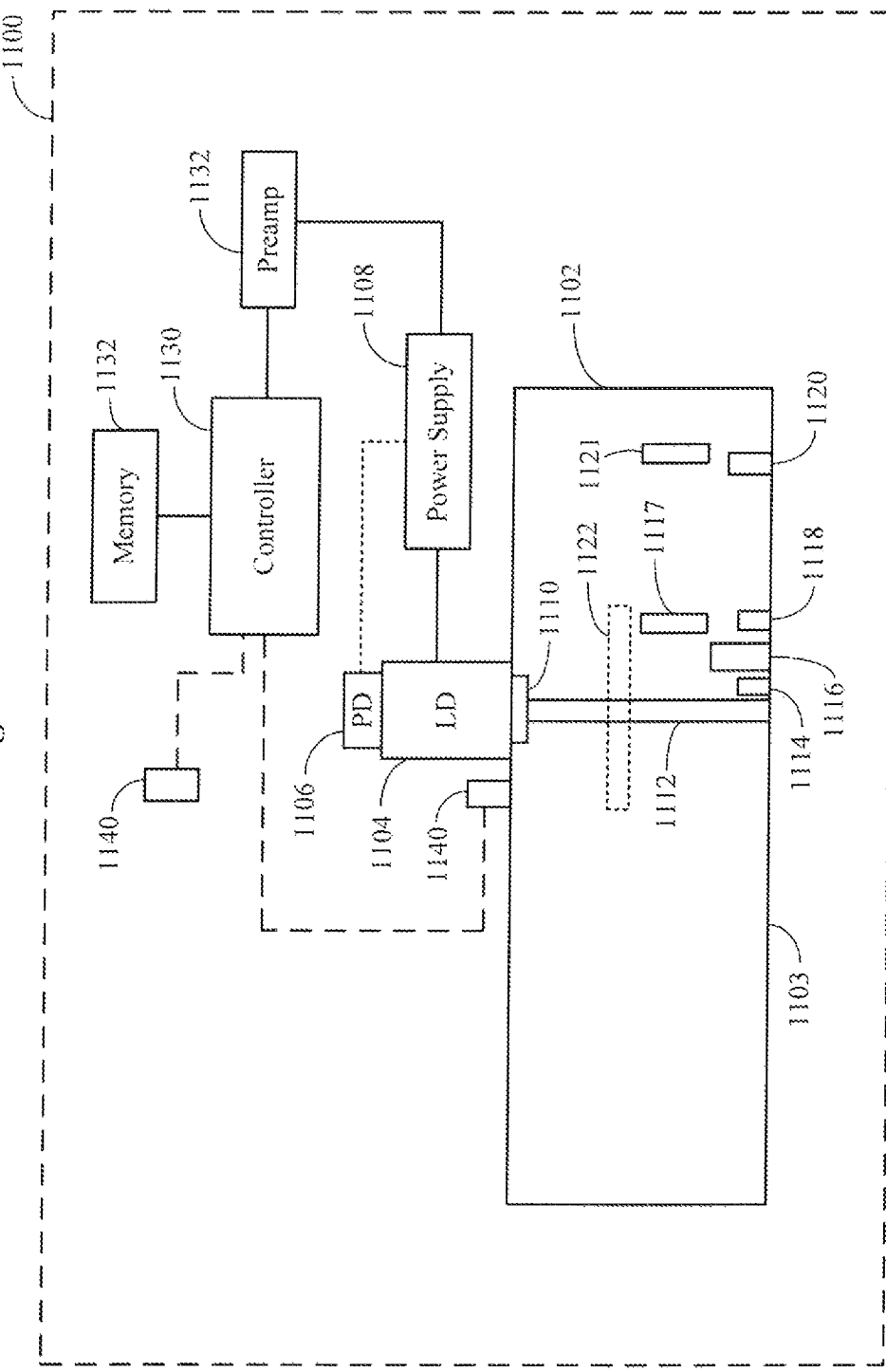
FIG. 11 is a block diagram of a system for calibrating a laser of a HAMR head using a temperature compensation equation approach in accordance with various embodiments.

FIG. 11 is a block diagram of a system for calibrating a laser diode of a HAMR head using a temperature compensation equation methodology in accordance with various embodiments. FIG. 11 shows a portion of a HAMR drive 1100 which includes a slider 1102 upon which a laser diode 1104 is mounted. A photodetector 1106 can be mounted on or in close proximity to the laser diode 1104. A power supply 1108 is coupled to the laser diode 1104 and provides a supply current (e.g., $I_{TOTAL}$, $I_{BIAS}$) to the laser diode 1104. An output of the photodetector 1106 is coupled to the power supply 1108. The power supply 1108 can adjust the current supplied to the laser diode 1104 in response to the photodetector output.

The slider 1102 includes a number of components including an optical waveguide 1112 which is optically coupled to the laser diode 1104 via an optical coupler 1110. The optical waveguide 1112 extends from the optical coupler 1110 to an NFT 1114 situated at the air bearing surface 1103 proximate the optical waveguide 1112. In some embodiments, a bolometer 1122 is situated proximate the optical waveguide 1112. A writer 1116 is situated proximate the NFT 1114. A writer heater 1117 is situated proximate the writer 1116 and configured to thermally actuate the writer 1116 (e.g., writer pole/NFT). A contact sensor 1118 may be situated proximate the writer 1116 and NFT 1114 (e.g., at a close point of the writer). A reader 1120 is shown positioned away from the writer 1116 and contact sensor 1118. A reader heater 1121 is positioned proximate the reader 1120 and configured to thermally actuate the reader 1120. A temperature sensor 1140 (e.g., a thermistor or thermocouple) is provided in the HAMR drive 1100 to measure an operating temperature of the drive 1100. In some embodiments, the temperature sensor 1140 is positioned close to the laser diode 1104 or the slider 1102. In other embodiments, the temperature sensor 1140 is positioned away from the slider 1102 but within the enclosure of the drive 1100.

The HAMR drive 1100 further includes a controller 1130 (e.g., microprocessor or microcontroller) coupled to a non-volatile memory 1132. A temperature compensation equation can be stored in the memory 1132, as well as data associated with ILPT processes. The controller 1130 is configured to implement the ILPT processes and update the temperature compensation equation in a manner discussed hereinabove. For example, the controller 1130 is configured to implement executable instructions corresponding to the flow charts and other figures discussed hereinabove.

The power supply 1108 is also coupled to a preamplifier 1132. The preamplifier 1132 can provide the power supply 1108 with signals corresponding to $I_{TOTAL}$ values for setting the total current supplied to the laser diode 1104 during write operations in accordance with the temperature compensation equation.

Systems, devices or methods disclosed herein may include one or more of the features structures, methods, or combination thereof described herein. For example, a device or method may be implemented to include one or more of the features and/or processes above. It is intended that such device or method need not include all of the features and/or processes described herein, but may be implemented to include selected features and/or processes that provide useful structures and/or functionality. Various modifications and additions can be made to the disclosed embodiments discussed above. Accordingly, the scope of the present disclosure should not be limited by the particular embodiments described above, but should be defined only by the claims set forth below and equivalents thereof.

What is claimed is:

1. A method, comprising:
generating, during manufacture of a heat-assisted magnetic recording (HAMR) disk drive, a temperature compensation equation using initial total currents supplied to a laser diode of the disk drive at different initial operating temperatures, the total currents representative of currents for recording data to or erasing data from the medium;
storing the temperature compensation equation in the disk drive;
updating, during field operation, the temperature compensation equation using a subsequent total current associated with an operating temperature differing from the initial operating temperatures; and
adjusting, using the updated temperature compensation equation, the total current supplied to the laser diode for a subsequent write operation in response to the operating temperature at the time of the subsequent write operation.

2. The method of claim 1, wherein:
a minimum and a maximum of the initial operating temperatures define limits of an initial operating temperature range; and
the temperature compensation equation is updated using the subsequent total current associated only with an operating temperature outside of the initial operating temperature range.

3. The method of claim 1, wherein:
a minimum and a maximum of the initial operating temperatures define limits of an initial operating temperature range; and
the temperature compensation equation is updated using the subsequent total current associated with an operating temperature inside or outside of the initial operating temperature range.

4. The method of claim 1, wherein:
the temperature compensation equation characterizes total currents for a range of operating temperatures including the initial operating temperatures;
the temperature compensation equation is updated in response to at least an X degree operating temperature change relative to a minimum or a maximum of the range of operating temperatures; and X is a number.

5. The method of claim 1, wherein:

the temperature compensation equation characterizes total currents for a range of operating temperatures including the initial operating temperatures;

for each X degree or more change in the operating temperature relative to a minimum or a maximum of the range of operating temperatures, one a plurality of subsequent total currents is measured;

the temperature compensation equation is updated in response to measuring N subsequent total currents;

X is a number; and

N is an integer.

6. The method of claim 5, wherein X is a number between 2 and 8, and N is an integer equal to or greater than 1.

7. The method of claim 1, wherein the temperature compensation equation is at least a second order polynomial equation.

8. The method of claim 1, wherein the temperature compensation equation is updated in response to measuring a performance metric that exceeds a predetermined threshold at the subsequent total current.

9. The method of claim 1, wherein updating the temperature compensation equation comprises:

writing data using a plurality of different subsequent total currents;

selecting a particular subsequent total current of the plurality of different subsequent total currents having an acceptable performance metric; and updating the temperature compensation equation using the particular subsequent total current.

10. The method of claim 1, wherein updating the temperature compensation equation continues until the temperature compensation equation covers a range of the operating temperatures that is at least coextensive with a temperature range specified for the disk drive.

11. An apparatus, comprising:

a slider of a heat-assisted magnetic recording (HAMR) disk drive movable relative to a magnetic recording medium, the slider comprising a writer, a reader, a near-field transducer, and an optical waveguide for communicating light from a laser diode to the near-field transducer;

a temperature sensor disposed in the disk drive and configured to measure an operating temperature; and a controller of the disk drive coupled to the slider and the temperature sensor, the controller configured to:

store a temperature compensation equation in a memory of the disk drive, the temperature compensation equation characterizing total currents supplied to the laser diode of the disk drive at different initial operating temperatures, the total currents representative of currents for recording data to or erasing data from the medium;

update, during field operation, the temperature compensation equation using a subsequent total current associated with an operating temperature differing from the initial operating temperatures; and adjust, using the updated temperature compensation equation, the total current supplied to the laser diode for a subsequent write operation in response to the operating temperature at the time of the subsequent write operation.

12. The apparatus of claim 11, wherein:

a minimum and a maximum of the initial operating temperatures define limits of an initial operating temperature range; and the controller is configured to update the temperature compensation equation using the subsequent total current associated only with an operating temperature outside of the initial operating temperature range.

13. The apparatus of claim 11, wherein:

a minimum and a maximum of the initial operating temperatures define limits of an initial operating temperature range; and the controller is configured to update the temperature compensation equation using the subsequent total current associated with an operating temperature inside or outside of the initial operating temperature range.

14. The apparatus of claim 11, wherein:

the temperature compensation equation characterizes total currents for a range of operating temperatures including the initial operating temperatures;

the controller is configured to update the temperature compensation equation in response to at least an X degree operating temperature change relative to a minimum or a maximum of the range of operating temperatures; and X is a number.

15. The apparatus of claim 11, wherein:

the temperature compensation equation characterizes total currents for a range of operating temperatures including the initial operating temperatures;

the controller is configured to measure one of a plurality of subsequent total currents in response to each X degree or more change in the operating temperature relative to a minimum or a maximum of the range of operating temperatures;

the controller is configured to update the temperature compensation equation in response to measuring N subsequent total currents;

X is a number; and

N is an integer.

16. The apparatus of claim 15, wherein X is a number between 2 and 8, and N is an integer equal to or greater than 1.

17. The apparatus of claim 11, wherein the temperature compensation equation is at least a second order polynomial equation.

18. The apparatus of claim 11, wherein the controller is configured to:

measure a performance metric at the subsequent total current; and update the temperature compensation equation using the subsequent total current in response to the performance metric exceeding a predetermined threshold.

19. The apparatus of claim 11, wherein the controller is configured to:

write data using a plurality of different subsequent total currents;

select a particular subsequent total current of the plurality of different subsequent total currents having an acceptable performance metric; and update the temperature compensation equation using the particular subsequent total current.

20. The apparatus of claim 11, wherein the controller is configured to update the temperature compensation equation until the temperature compensation equation covers a range of the operating temperatures that is at least coextensive with a temperature range specified for the disk drive.

* * * * *